United States Patent [19]

Brodrick et al.

[11] Patent Number: 5,209,313
[45] Date of Patent: May 11, 1993

[54] LIFT WEIGHING

[75] Inventors: Ronald F. Brodrick, Wayland; Roger W. Masson, Acushnet, both of Mass.

[73] Assignee: Teledyne Industries, Inc., Los Angeles, Calif.

[21] Appl. No.: 676,814

[22] Filed: Mar. 28, 1991

[51] Int. Cl.$^5$ .................. G01G 19/08; G01G 19/14
[52] U.S. Cl. ................................ 177/139; 177/147
[58] Field of Search .................. 177/139, 145-147

[56] References Cited

U.S. PATENT DOCUMENTS 4,421,186 12/1983 Bradley ........................... 177/139
4,623,029 11/1986 Bambauer et al. ............... 177/137

Primary Examiner—George H. Miller, Jr.

[57] ABSTRACT

Lift weighing arrangements in which arms to lift supports carry strain gauges.

7 Claims, 4 Drawing Sheets

LIFT WEIGHING

FIELD OF THE INVENTION

This invention relates to the weighing of material being lifted by the fork of a truck or the like.

BACKGROUND OF THE INVENTION

It is known in the prior art to use strain gauges in scales used for weighing.

SUMMARY OF THE INVENTION

It has been discovered that weight of a mass being lifted, for example by the fork of a truck, may be usefully determined by means of strain gauges functionally interrelated with the lifting element.

In preferred embodiments, eight strain gauges are carried by a pair of generally upside down U-shaped supports to which the fork is pivotally cantilevered, two strain gauges being mounted on a front arm and two strain gauges on a back arm of each of the supports.

PREFERRED EMBODIMENT

There will now be described the presently preferred embodiment of the invention, with drawings and a description of structure and operation.

DRAWINGS

STRUCTURE

Figure 1:
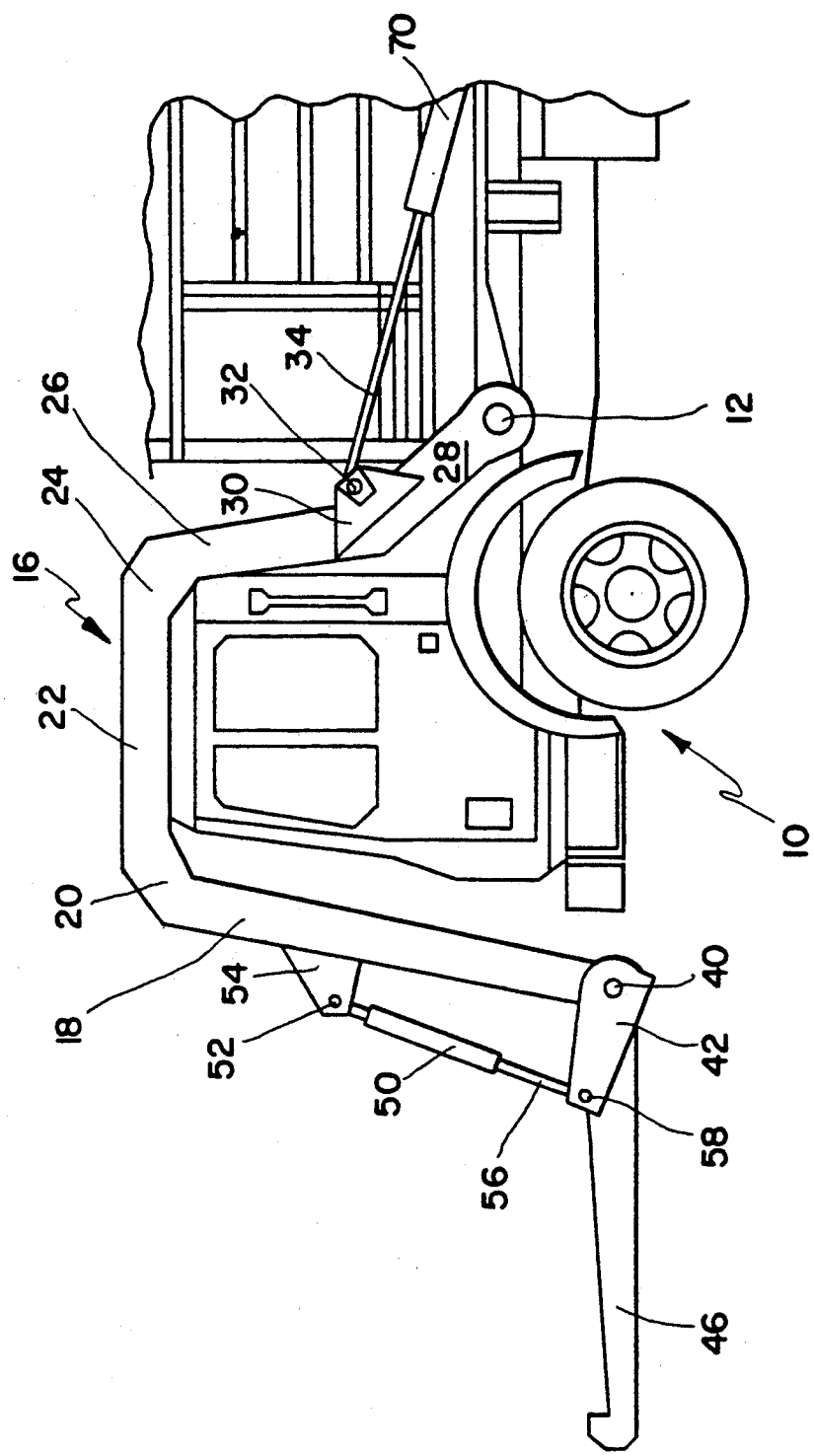
FIG. 1 is a side elevation, partially broken away, of a preferred embodiment of the invention.
Figure 2:
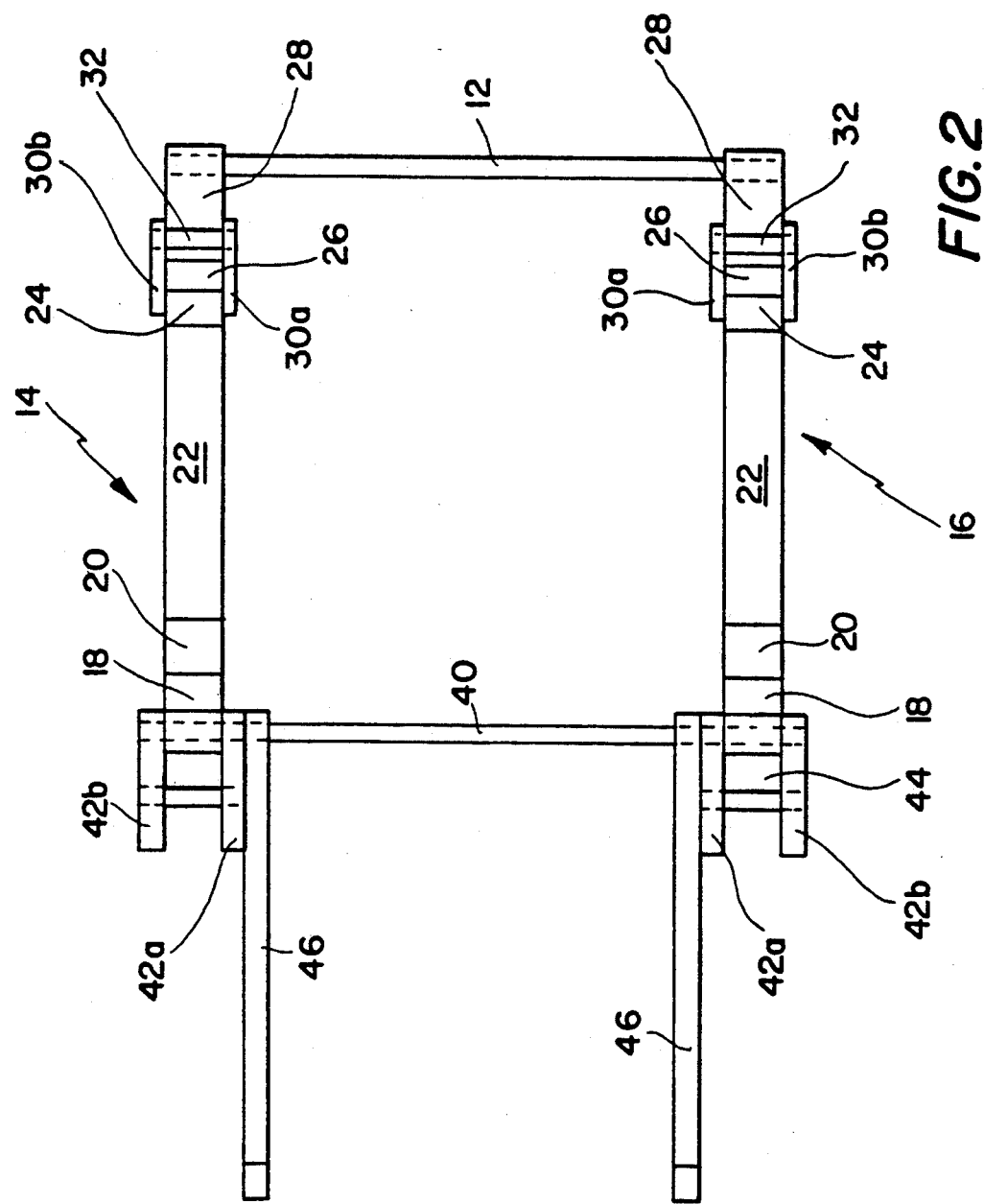
FIG. 2 is a plan view of a portion of FIG. 1.

There is shown in FIG. 1 a truck indicated generally at 10.

A truck as illustrated in FIG. 1 is commercially available from Heil Co., 3000 W. Montana St., Milwaukee, WI 53201.

Carried by truck 10 is shaft 12, on which are pivotally mounted frame members 14, 16. Each member 14, 16, includes a generally vertically upwardly extending portion 18, a rearwardly angled portion 20, a generally horizontal portion 22, a downwardly rearwardly angled portion 24, a generally downwardly extending second portion 26, and a third downwardly and rearwardly extending portion 28 mounted for pivotal movement on shaft 12.

Portion 18 has a centerline, in length to its intersection with the centerline of portion 22, of 91 inches. Portion 22 has a length of centerline, to its intersection with that of portion 26, of 56 inches. Portion 26 has a centerline, from that point to its intersection with the centerline of portion 28, of 40 inches. Portion 28 has a centerline of length, from there to shaft 12, of 31 inches.

Welded to frames 14, 16 are yokes 30, which consist of pairs of plates 30a, 30b, each of which carries shaft 32 with respect to which pistons 34 on each side of the truck are located for selectively moving yokes 30 generally rearwardly while the yokes 30 move in rotation about shafts 32 relative to pistons 34.

Pivotally mounted on shaft 40 carried by the lower portions of frame portion 18 are a pair of bracket links 42, each including link plates 42a, 42b and, mounted therebetween, shafts 44. Welded to brackets 42 are forks 46. Pistons 50 are mounted between shafts 52 in brackets 54 welded to support portions 18 and pistons 56 secured to shafts 44.

Figure 3:
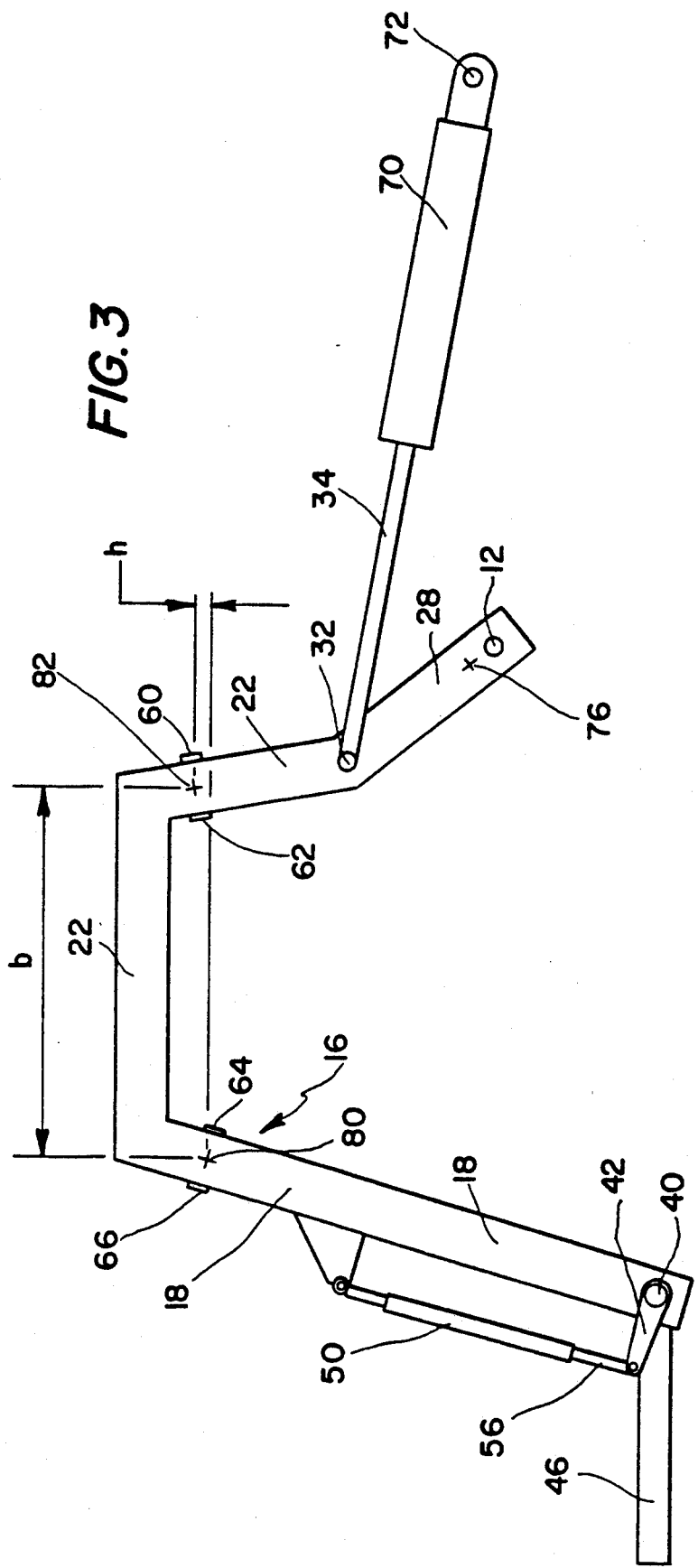
FIG. 3 is a side elevation, somewhat diagrammatic, of portions of said preferred embodiment.
Figure 4:
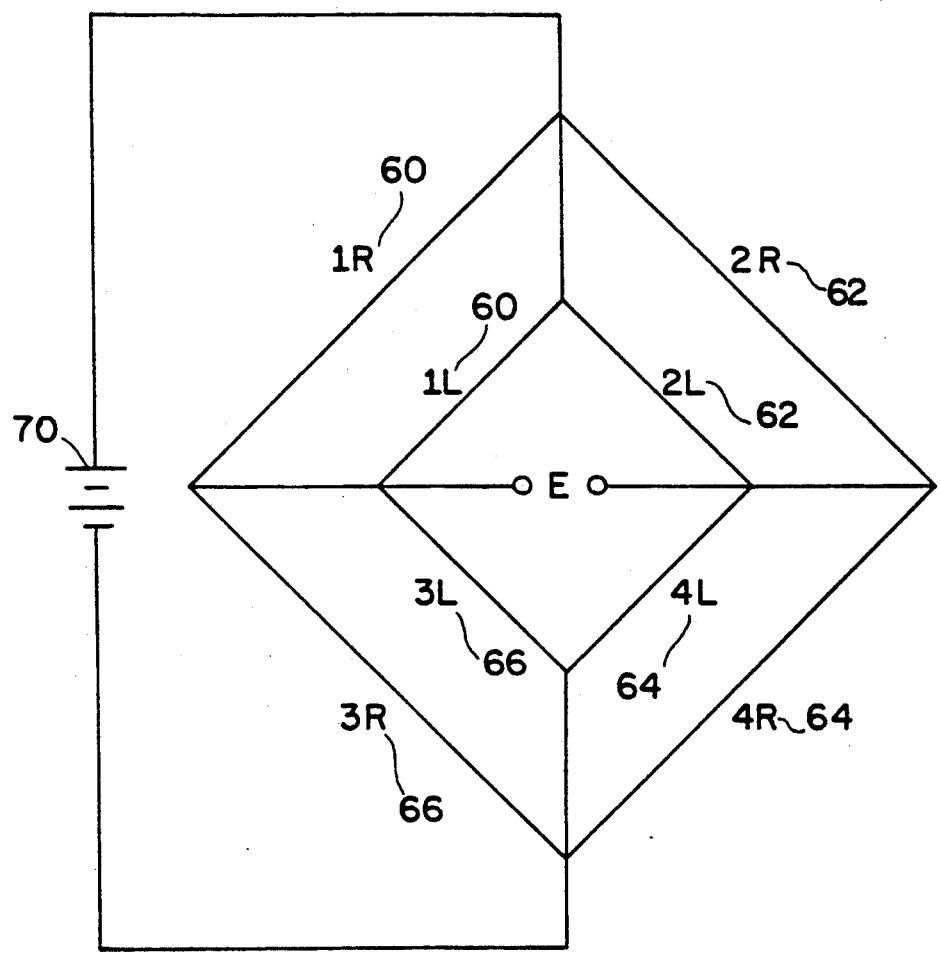
FIG. 4 is a circuit diagram with respect to said preferred embodiment.

In FIG. 3 is shown the mounting, on the left hand support member 16, of strain gauges 60, 62, 64, and 66, indicated in FIG. 4 also as 1L, 2L, 3L, and 4L. These strain gauges are in the preferred embodiment micromeasurements type CEA-06-W250A-350, sold commercially by Measurements Group, Inc., P.O. Box 2777, Raleigh, NC 27611. A corresponding set is mounted in corresponding locations on the right hand support member 14. The support members are hollow beams four inches by twelve inches in external dimension of cross-section, the strain gauges being mounted on four-inch sides, with their resistances running generally parallel to their supports' axes.

The strain gauges are mounted in low profile, covered with protective materials, and cabling from them to a microprocessor under the front of the vehicle cargo box is nested for protection among prior art hydraulic lines. Multiplexing permits communication between microprocessor and truck cab using only two lines.

Cumulative net weights added to the truck are stored in the microprocessor, and provision made for indication to the operator of full load.

The circuit is arranged in double Wheatstone bridge configuration as shown in FIG. 4, with battery 70 and output, indicated generally at "E", 72.

The letter "b" in FIG. 3 is the horizontal distance between the projections in plan of the centerline between strain gauges 60, 62 and 64, 66. The letter "h" denotes the vertical distance between those same centerlines in side elevation projection. Elimination of slanted portions 20, 24, as in the somewhat diagrammatic FIG. 3 does not affect this.

In the preferred embodiment, as shown, the strain gauges are mounted on generally vertical frame support portions, and the centerline 80 toward the front of the truck is lower than the centerline 82 relatively toward the rear of the truck.

In consequence, the two beam systems 14, 16 are bent during the lifting, the beam portions toward the rear of the truck being because of their greater distance from the forks 46 bent more than those toward the front of the truck, so that signal output is greater at strain gauges 60, 62 (tension and compression, respectively) than at strain gauges 64, 66 (compression and tension, respectively).

FIG. 4 illustrates the preferred circuit for handling the signals, the outer diamond subtracting the smaller signal from the larger for one side of the truck, and the inner diamond subtracting the smaller signal from the larger for the other side of the truck. It has been found that connecting in subtraction makes measurements less sensitive to the exact position of the load on the forks 46. The outputs for the two sides are connected in parallel, for averaging.

Mounted at location 76 on arm 28 is an electronic clinometer sold by Lucas Sensing Systems, Inc., 21640 N. 14th Avenue, Phoenix, AZ 85027-2839, which senses the angle of the arm 28 to the vertical and provides reflective analog signals to a microprocessor (not shown).

OPERATION

In operation, forks 46 are inserted under a load to be lifted, and cylinder 70 operated to cause piston 34 to move toward cylinder 70, causing supports 14, 16 to rotate clockwise about shaft 12, causing corresponding movement of forks 46. At the same time, cylinder 50 is operated to cause piston 56 to move toward cylinder 50, imposing through yoke 42 additional rotational movement of forks 46, clockwise about shaft 40.

As the load is lifted on forks 46, the analog output at E in FIG. 4 is digitized at a rate of 100 samples per second. At the same time, the digitized output just mentioned is smoothed by using a 100-point moving average. As each digital measurement above described is made, a synchronized digital measurement is made by the clinometer. The smoothed (moving average) signal output measurements are then corrected in a microprocessor also doing the digitizing mentioned to convert signal measurements to those corresponding with plan projection horizontal distances for b, as above mentioned. The mean value of the corrected moving average over a one-second period from the occurrence of maximum signal value is then determined.

A similar approach is taken after the forks are unloaded, on their way back down, to determine tare weight, and the difference is noted, one way or another, as the weight of one load lifted by the fork.

Standard deviation limits are set into the microprocessor for the smoothed curve, so that if the data are too rough the operator may be given the signal that the particular weighting is invalid.

Taking measurements thus, on the fly and without the delay required to allow the lift spring system to decay, importantly improves the speed with which the measurements are accomplished.

OTHER EMBODIMENTS

Other embodiments will occur to those skilled in the art.

For example, the pairs of strain gauges could both be placed on horizontal portion 22 of the supports, one pair toward the front of the truck and one pair toward the rear of the truck, the centerlines falling on vertical lines between respective pairs.

Measurements can be made while the load lifting support is stationary rather than while it is moving.

The length of b can be varied, but is desirably large enough to provide desired subtractive signal strength. The dimension h can be negative, as in FIG. 3 with pair centerlines toward the truck front lower than those toward the truck rear, zero, or positive (the reverse of FIG. 3). We have found that improved control is achievable on occasion by making h a negative number, so that the true value of b (in, i.e., plan projection) first increases and then decreases as forks 46 rise.

What is claimed is:

1. Lift mechanism comprising:
   mass support means,
   vehicle means,
   arm means interconnecting said mass support means and said vehicle means for relative movement therebetween,
   said arm means comprising a pair of arms, each said arm being pivotally mounted about a pivot axis, and
   two pairs of strain gauges on each said arm,
   a first pair being nearer to and a second pair being farther from said mass support means,
   said pivot axis being farther from said mass support means than said second pair of strain gauges,
   in which said arms are parallel, and have the general configuration of an upside-down U.

2. The combination of claim 1 in which the distance vertically between a said pair h is negative.

3. The combination of claim 1 in which said strain gauges are connected in a Wheatstone bridge, subtractively of the output of the pair nearer said mass support means from the output of the other pair.

4. The combination of claims 1 or 3 in which said two pairs are correspondingly connected in a pair of Wheatstone bridges, the outputs of said pair of Wheatstone bridges being connected in parallel.

5. The combination of claim 1 in which said arm means carries a clinometer.

6. The combination of claim 1 in which said pairs of strain gauges are carried by generally vertically extending arms of said arm means.

7. The combination of claim 1 in which h is negative.

* * * * *